3,206,320
METHOD OF PREPARING A SOYA PROTEIN ADHESIVE COMPOSITION
Glenn Davidson, Aurora, Ill.; Edna D. Davidson, executrix of said Glenn Davidson, deceased, assignor to Edna D. Davidson, Aurora, Ill.
No Drawing. Filed June 13, 1961, Ser. No. 116,663
4 Claims. (Cl. 106—154)

This application is a continuation in part of my then allowed application of the same title Serial No. 683,453, filed September 12, 1957, now abandoned.

This invention is a method of producing from soya bean protein a water resistant adhesive base compound which, when subjected to temperature variations, exhibits a behavior characteristic of (or similar to) animal glue. Thus, my novel adhesive base compound is fluid at elevated (above room) temperature and gelatinous or very viscous (approaching gelatinous consistency) at ordinary (room) temperature. My novel compound can be reversibly transformed many times, for a considerable period of time, from fluid to gelatinous, or highly viscous consistency, and vice versa, without significant loss of bonding power.

My novel adhesive base compound is formed by reacting soya bean protein with carbon disulfide, under conditions basically different from those employed conventionally in producing water resistant soya/$CS_2$ adhesives, as disclosed in Patent No. 2,150,175.

My novel adhesive base compound represents a new chemical compound of different nature from any known protein-carbon-disulfide reaction products.

Terms used in this specification are defined as follows:

"Full-fat" soya flour is simply ground whole soya beans. This product normally contains 18% to 20% soya oil.

"High-fat" soya flour is made by grinding the cake resulting from expressing the oil from whole soya beans, as by "expellers," screw presses or hydraulic presses. This product normally contains 5% to 7% soya oil.

"Low-fat" soya flour is made by grinding the flakes resulting from extracting the oil from flaked soya beans with a solvent such as hexane. This product normally contains about ½% soya oil.

All three soya flours contain, in addition to protein, substantial amounts of hemicelluloses, sugars, ash and other components natural to soya beans.

As mentioned by H. R. Hall ("The Use of Isolated Soybean Protein in Paper Coatings"), TAPPI vol. 38, No. 4, April 1955, pages 249 thru 252, there are at this time, two types of isolated soya bean proteins available commercially. These two types are the modified and the unmodified isolated soya bean proteins.

The raw material for making both types of isolated proteins is solvent extracted soya bean flakes containing about 44% protein, 34% carbo-hydrates, 12½% moisture and ½% oil.

In the preparation of unmodified isolated soya bean protein, the raw material is dissolved in an aqueous sodium hydroxide solution having a pH of from 7 to 10, at a temperature of from about 105° to 110° F. The resulting solution has a protein concentration of about 2% and contains some insoluble material which is separated by screening and centrifuging. Thereafter, the protein is precipitated by addition of an acid, such as sulfuric acid, to a pH of about 4.6 or by self-souring (lactic acid fermentation), or by electrodialysis. The protein curds are centrifuged, which raises the solids content to 12 or 13%, washed with water, further dewatered in an Oliver type filter press, which raises the solids content to about 40%, dried on a Procter and Schwartz traveling apron drier, which reduces the moisture content to about 8%, and ground. The resulting unmodified isolated soya bean protein approaches very closely the native undenatured soya bean protein, freed of the non-protein components of the soya bean.

The modified isolated soya bean protein is made by a process identical with that described in the preceding paragraphs, except that the precipitated and centrifuged protein is redissolved in aqueous alkali and digested at a high pH at an elevated temperature, in the presence of a peroxide type catalyst such as sodium peroxide. The protein is then re-precipitated with acid, centrifuged, washed, filtered, dried and ground.

The unmodified and the modified isolated soya bean proteins differ sharply from each other in dispersion behavior. Thus, a dispersion of the unmodified isolated protein containing no reducing agents is much more viscous than a similar dispersion of the modified isolated protein. Other differences between the two types of isolated protein are pointed out in the above noted article by H. R. Hall.

The "working properties" of a glue or adhesive composition are those properties which relate to the ease and uniformity with which the glue may be applied in thin layers to surfaces such as those of paper or wood veneer. While including characteristics such as viscosity and flowability, the "working properties" of a glue cannot be precisely or accurately described in words or defined in technical terms, on the basis of presently available data and testing methods. Even so, relatively good and poor "working properties" of a glue are readily recognizable on sight, by those skilled in the art.

The "pot-life" of a glue is the length of time (immediately following preparation of the glue) during which the glue will retain satisfactory working properties, bonding strength, and, if of the water resistant type, its water resistance. A "short pot-life" is one of less than 6 hours, commonly 4 hours or less. A "long pot-life" is one of more than 6 hours. A "pot-life" of 40 hours or more is highly desirable.

The term "water-resisting" is used in light of Joint Army-Navy Specification "JAN–108."

The term "total hydroxide content" designates the sum in pounds of alkali metal and alkaline earth metal hydroxides used (on a basis stoichiometrically equivalent to sodium hydroxide) per 100 pounds of soya flour.

The term "soya glue base" designates an aqueous alkaline soya flour or protein dispersion suitable for use as an adhesive composition either as prepared or when having incorporated therewith, various amounts of one or more of the so-called "extenders," such as clay, barytes, calcium carbonate, asphalt, emulsions of asphalt or various synthetic or natural resins, particularly alkaline phenol formaldehyde resins, latices of natural or synthetic rubbers, water glass, wood flour, walnut shell flour, and the like.

The term "paper laminating" designates the production of laminated assemblies wherein one or more plies are paper, as paper to paper, paper to wood, paper to metal foil, paper to plastic, paper to glass, and the like. The term "paper" includes not only webs or sheets, but also cardboards and cellulosic boards of greater thickness, irrespective of contour, including e.g. "corrugated" container board.

The term "carbon disulfide thickening effect" designates the progressive increase in viscosity always noted in conventional soya glue bases subsequent to the preparation of such glue bases and continuing for some hours thereafter. Such continuous progressive thickening of the glue base causes variations in its working properties which makes uniform application thereof difficult, if not impossible.

Water resisting soya/$CS_2$ bases are conventional in the art. All such glue bases are made by incorporating carbon disulfide with the glue bases during the preparation thereof. But unless some provision is made to counteract the carbon disulfide thickening effect always noted as a result of the addition of carbon disulfide, such glues do not have constant satisfactory working properties. Only one expedient for counteracting the carbon disulfide thickening effect is known to those skilled in the art, and that is the use of a "total hydroxide" content in the glue base of about 18 to 20 pounds per 100 pounds of "low-fat" soya flour. This high "total hydroxide" content induces progressive hydrolysis and degradation of the protein content of the glue base, with resultant reduction in viscosity more or less compensating for the increase in viscosity due to the carbon disulfide thickening effect. In other words, two simultaneous reactions take place in the glue base (a viscosity raising reaction with carbon disulfide and a viscosity reducing reaction with alkali metal hydroxide) which for some time, approximately balance each other so that the working properties of the glue base are not affected too greatly. But, after about 4 hours the degradation of the protein (under the influence of the high "total hydroxide" content) has progressed so far as to destroy most, or all, of the bonding strength of the glue base. Hence, all conventional water resisting soya glue bases are characterized by a "short-pot life."

It should be noted, in this connection, that conventional soya/$CS_2$ glue bases are always prepared and used for laminating, at room temperature. In other words, such glue bases are not exposed to elevated temperatures (100° F. or higher) subsequent to the incorporation of the hydroxides therewith.

It should further be noted that conventional soya flour/$CS_2$ glue bases differ essentially, in one important point, from animal glues often used for laminating purposes. Animal glues, when dispersed in water, are liquid at elevated temperatures and gelatinous at room temperatures. Further, aqueous animal glue dispersions may repeatedly be subjected to heating (for liquifaction) and cooling (for gelling) without therefore losing their desirable working properties or their bonding strength. But, no one has heretofore prepared any water resisting soya/$CS_2$ glue base which can be subjected to such temperature-dependent changes in consistency, even apart from the short pot-life of such conventional glues which does not allow time for such temperature changes.

It should also be noted that conventional soya/$CS_2$ glue bases have not been found suitable for use in modern continuous paper laminating processes where the plies are fed through a laminating machine at a rate of from 250 to 300 feet or more pere minute, as disclosed for instance, in the patent to Koenig et al. Patent No. 2,597,006. In such laminating processes, pressure is applied to the plies within less than one second after the glue is applied. If the glue still is liquid at the time pressure is applied (and conventional soya/$CS_2$ glue bases are still liquid for several seconds or minutes after application), then the glue will be squeezed out at the edges of the plies and also into the plies, i.e. the glue will penetrate into the plies, with resultant weak adhesive bonding of the plies.

The methods and compositions of the present invention involve particularly "low-fat" soya flour and unmodified isolated soya bean protein. "Full-fat" soya flour, "high-fat" soya flour and modified isolated soya bean protein are inoperative for the purposes of the present invention.

The conversion of the above noted "low-fat" soya flour and low viscosity unmodified isolated soya bean protein into a water resistant adhesive base compound similar to animal glue involves a reaction of this soya flour and soya bean protein with carbon disulfide under novel conditions.

Reference is made to U.S. Patent No. 2,150,175 which teaches the "controlling" or the "counteracting" or, in other words, the reducing, so far as is practical, of the carbon disulfide thickneing effects by the use of amounts of alkaline reagents (e.g. sodium hydroxide) sufficiently large to produce considerable hydrolysis of the thick protein-carbon-disulfide complex. Note that the temperature is room temperature, certainly below 100° F., at the alkali concentration taught in this patent, the soya protein will hydrolyze at 115° to 120° F. within one-half to one hour to form a completely useless watery slurry.

Patent No. 2,150,175 specifically teaches the use of caustic soda or potash in an "amount to neutralize any acid substances present, and to disperse the protein in order to render the adhesive of desirable consistency, and there being additional caustic compound present in amount to counteract the thickness effect of the carbon disulfide."

My method of producing a new soya/$CS_2$ glue base having characteristics similar to animal glue comprises two features which are new in the art of formulating soya/$CS_2$ glues:

(1) I do not incorporate with my new soya glue base "additional caustic compound present in an amount effective to counteract the thickening effect of carbon disulfide" (Patent No. 2,150,175) but use only an amount of alkaline compound sufficient "to neutralize any acid substances present and to disperse the protein in order to render the adhesive of desirable consistency";

(2) I elevate the temperature of my new soya/$CS_2$ glue base above 100° F.

The significance of the two above noted novel features are illustrated by the following experiments using a currently typical conventional formulation of "low-fat" soya flour glue base with carbon disulfide as shown in the patent to Golick No. 2,612,455. In this formulation the sum of the amounts of sodium and calcium hydroxides per 100 pounds "low-fat" soya flour is 20 (i.e. a "total hydroxide" content of about 20), which follows the teaching of Patent No. 2,150,175.

First (in accordance with Golick), I prepared a composition of the following ingredients:

| | Grams |
|---|---|
| Water at 70° F. | 1250 |
| "Low-fat" soya flour | 400 |
| Calcium hydroxide (suspended in 100 grams water) | 48 |
| Sodium hydroxide (dissolved in 100 grams water) | 32 |
| Sodium silicate | 100 |
| Carbon disulfide | 7 |

These ingredients were combined in the order listed with agitation, to produce a smooth composition which is immediately ready for use.

Thirty minutes after the addition of the carbon disulfide the pH was 12.35 and the viscosity 5600 cps.

The glue base was then heated to 150° F. and that temperature maintained for 20 minutes followed by cooling rapidly to 80° F. The viscosity at 80° F. was 200 cps. and the pH 12.25. The addition of 0.15% (on the basis of soya flour) of ferric chloride produced no greenish color.

Next, I prepared another batch of glue base exactly as described herein above. Thirty minutes after the addition of the carbon disulfide this batch had a pH of 12.35 and a viscosity of 5200 cps. at 82° F. Then, in order to neutralize "the additional caustic compound present in amount effective to counteract the thickening effect of the carbon disulfide," I added 80 grams boric acid crystals. Thirty minutes after the addition of the boric acid the pH was 11.2 and the viscosity was 11,200 cps. at 82° F.

I then heated the batch to 150° F. and maintained that temperature for 20 minutes, followed by cooling to 130° F. The viscosity at 130° F. was 18,400 cps. in combination with excellent flow and spreading characteristics. The temperature of 130° F. was maintained for 7 hours with continuous agitation. The water lost by evaporation from the batch during this period was replaced from time to time. The viscosity at the end of 7 hours was 19,100 cps. at 130° F. The batch was then allowed to cool to room temperature and to stand overnight without agitation. The next morning the gel which had formed at 78° F. had a pH of 11.4. The gel was melted by raising the temperature to 130° F. with agitation. The viscosity at 130° F. was 18,600 cps. The temperature was kept at 130° F. for 5 hours, with agitation, and the water lost by evaporation was replaced from time to time. At the end of this 5 hour period, the viscosity was 18,000 cps. at 130° F. Again, the batch was allowed to cool to room temperature and to stand overnight without agitation. The second morning, the gel that had formed at 76° had a pH of 11.4. This gel was remelted at 130° F. and at that temperature had a viscosity of 17,800 cps.

Beginning with the time the glue was first cooled from 150° F. to 130° F., samples were removed from time to time and ferric chloride was added to the sample in an amount equal to about 0.15% of the approximate weight of the soya flour in the sample. In every instance, a definite greenish color developed within a few minutes.

In preparing my novel soya glue bases from "low-fat" soya flour or from low viscosity unmodified isolated soya bean protein, I disperse this soya flour or this isolated soya bean protein in a suitable amount of water containing preferably an amount of alkaline reagent or reagents adapted to produce maximum carbon disulfiide thickening effect at some temperature above 100° F. I then add the carbon disulfide and heat the dispersion at some temperature above about 100° F. until the carbon disulfide thickening reaction is complete, or nearly so. The higher the temperature, the more quickly maximum thickening is obtained. When a relatively high temperature has been used to accelerate and accentuate the thickening reaction, and maximum thickening has been effected at this relatively high temperature, the temperature may be reduced somewhat from the level effecting maximum carbon disulfide thickening in minimum time, as long as the temperature is kept at about 100° F. or higher, if it is desired to keep the glue base fluid.

The product obtained by this method is the above noted novel water resistant soya/$CS_2$ glue base which is fluid above 100° F. and gelatinous at temperatures below 100° F., e.g. room temperature, and which can be transformed many times, over a long period of time, from fluid to gelatinous condition, and vice versa, without deterioration.

I have found that alkaline earth hydroxides, such as calcium and also barium and strontium hydroxides, behave differently with respect to effecting production of carbon disulfide thickening at temperatures below and above 100° F. as shown in my copending application Serial No. 673,179, filed on July 22, 1957, now abandoned, calcium hydroxide possesses not more than negligible ability to produce carbon disulfide thickening at temperatures below 100° F. regardless of how much calcium hydroxide is used per each part of vegetable protein. At temperatures above 100° F. on the other hand, calcium hydroxide is equivalent to sodium hydroxide, on a stoichiometrical basis, for effecting carbon disulfide thickening. The same is true of calcium hydroxide as to ability to reduce viscosity (to hydrolyze) carbon disulfide thickened vegetable protein. Thus, the maximum amount of calcium hydroxide permissible in my method is approximately equal to the maximum permissible amount of sodium hydroxide. This is quite surprising in view of the data set forth in my copending application Serial No. 673,179.

Generally, I have found that maximum carbon disulfide thickening occurs and the best working properties and longest pot-life are obtained when an amount of alkaline reagent is used that is just below that required to produce even a small amount of hydrolysis of the protein-carbon-disulfide complex in 24 hours at a temperature above 100° F. Such hydrolysis is evidenced by a reduction in viscosity and the evolution of small amounts of ammonia. Or an amount of alkaline reagent just below that required to prevent the development of a greenish color upon the addition of ferric chloride. That is, the smallest amount of alkaline reagent required to produce hydrolysis as above described and the smallest amount of alkaline reagent required to prevent the development of a greenish color with ferric chloride are substantially the same amount. When the indicated amount of alkaline reagent is used, carbon disulfide thickening is accelerated as to time and accentuated as to amount by the use of temperatures above 100° F.

For "low-fat" soya flour, from about 4½ to 5½ pounds of "total hydroxide" per 100 pounds of soya flour are preferred. From about 3½ to 4½ pounds are operative, but the working properties and ease of preparation are not as good as in the preferred range. From 5½ to 8 pounds are also operative, but the pot-life is somewhat shorter than the preferred range, although longer than that of conventional soya glues.

For unmodified isolated soya bean protein from about 5½ to 8½ pounds of "total hydroxide" per 100 pounds of soya bean protein are preferred. From about 3½ to 5½ pounds are operative, but the working properties and ease of preparation are not as good as in the preferred range. From 8½ to 11 pounds are also operative, but the pot-life is somewhat shorter than the preferred range, although longer than that of conventional soya glues. These larger amounts are most suitably used at relatively low temperatures, from about 100° F. to about 120° F. Even at these low temperatures, the carbon disulfide thickening is accelerated at these larger amounts of hydroxides.

Alkaline salts may be used in place of alkali metal and alkaline earth metal hydroxides, for instance, alkali metal salts of weak acids such as the sodium and potassium carbonates, silicates (ortho and meta), aluminates, phosphates and the like. An amount of alkaline salt is used stoichiometrically equivalent to at least 3½ parts sodium hydroxide, per each 100 parts (by weight) of soya flour or protein. The production of a carbon disulfide thickening effect by such alkaline salts, at 100° F. or higher temperatures, is quite surprising, since no such effect is obtained at below 100° F. When small amounts, such as 5 parts, of such alkaline salts are used, carbon disulfide thickening proceeds very slowly. Almost two hours at 170° to 180° F. are required. About 25 to 30 pounds give thickening rates comparable to 3½ to 5½ parts sodium hydroxide (for "low-fat" soya flour) or 3½ to 8½ parts (for unmodified isolated soya bean protein). Complete thickening effect is reached within 20 to 30 minutes at 140° F. and within 10 to 15 minutes at 170° to 190° F. The maximum pH obtainable with sodium carbonates, silicates, phosphates, aluminates and the like are too low to effect hydrolysis of the protein-carbon-disulfide complex. Therefore, there is no critical upper limit for the amount of such alkaline salts added to the soya glue base, from the standpoint of causing deterioration. For example, 100 parts of soda ash may be used with 100 parts of unmodified isolated soya bean protein.

Thus, according to the present invention, a soya/$CS_2$ glue base is prepared by heating an alkaline aqueous dispersion of "low-fat" soya flour or unmodified isolated soya bean protein containing carbon disulfide above about 100° F. until gel formation and thickening is produced, due to the above noted carbon "disulfide thickening effect." According to the present invention, this thickening effect is promoted and accelerated by maintaining a temperature of above about 100° F. so that within a short time, ordinarily less than 30 minutes, and usually about 20 minutes, the reaction causing such gel formation and thickening is substantially complete.

In other words, my above mentioned two new features convert "carbon disulfide thickening" as it has been known in the past, into thermally reversible carbon disulfide gel formation.

For the purposes of this invention it suffices to hold the temperature above about 100° F. until the dispersion has thickened substantially. Gel formation is not evident at a temperature above about 100° F. The changes occurring on heating of the new glue base above about 100° F. can easily be followed by removing small samples at frequent intervals, cooling samples, and noting when gel formation occurs.

Further, it is at least very interesting to add ferric chloride to such a series of samples, and note the time when the new soya/$CS_2$ glue base first develops the ability to produce a definite greenish color with ferric chloride. Experience to date, suggests that as my new soya/$CS_2$ glue base is heated, the ability to form a greenish color with ferric chloride and the ability to form a satisfactory gel upon cooling, develop simultaneously, or nearly so.

It is critically important to maintain the temperature above about 100° F. The temperature may range up to about 200° F. or even higher without basically modifying the functioning of the soya glue base except for the loss of water which occurs at temperature approaching 200° F. Hence, a temperature of 100° F. to 150° F. is preferred, and a range of about 130° to 150° is most desirable.

The amount of carbon disulfide used may vary from slightly less than ½ pound to 10 pounds per 100 pounds of "low-fat" soya flour without basically changing the characteristics of the resultant glue base. About 2 pounds is preferred.

The amount of water used is simply that effecting any particular viscosity desired in the soya glue base. Ordinarily, from 250 pounds to 400 pounds of water per 100 pounds of "low-fat" soya flour and 400 pounds to 700 pounds per 100 pounds unmodified isolated soya bean protein will give working properties (including viscosity) suitable for most laminating purposes.

At temperatures only slightly above about 100° F., the amount of water used (as compared with the amount used at 120° or 130° F. or higher) should be slightly higher and the elevated temperature should be maintained for a somewhat longer period of time, say ½ to 1 hour, in order to bring about a complete carbon disulfide thickening effect (i.e. gel formation ability). However, the glue bases thus prepared at temperatures only slightly above 100° F., may be characterized by somewhat lower gel strength, which may be objectionable in some, but not all laminating operations.

The "total hydroxide" content is critically important. If the "total hydroxide" content exceeds the above disclosed upper limits, the alkaline hydrolysis of the protein proceeds so fast as to make the resulting soya glue base worthless as an adhesive.

My new soya/$CS_2$ glue bases are characterized by excellent working properties, "long pot-life" and good "water-resistance."

Specifically, my new soya/$CS_2$ glue bases may be employed for a purpose where conventional soya/$CS_2$ glue bases are inoperative, namely, rapid continuous paper laminating, as disclosed, for instance, in the above noted patent to Koenig. In such laminating the new soya/$CS_2$ glue base is applied to paper or the like at an elevated temperature where the new soya/$CS_2$ glue base is liquid so that it can be applied as a thin film, as is required in such laminating. But immediately upon application the new soya/$CS_2$ glue base is chilled or cooled when contacting the paper or the like which causes the new soya/$CS_2$ glue base to gel almost instantaneously. Thus, within the brief space of time (less than one second) elapsing in the travel of the paper from the point where the new soya/$CS_2$ glue base is applied to the pressure rolls, the glue base has gelled. When so gelled, the new soya/$CS_2$ glue base resists both being squeezed out at the edges of the plies and being sqqueezed into the plies. Thus, with my novel soya/$CS_2$ glue base, a better and stronger bond is obtained with a lower glue consumption, and at higher paper speeds, as compared with conventional soya/$CS_2$ glues, which do not possess temperature dependent gel-forming capacity.

The new soya/$CS_2$ glue bases of this invention also offer many advantages over conventional soya glue bases in manufacturing plywood according to the process of the patent to Galber et al., No. 2,402,494 (the so-called "no clamp method"). While conventional soya/$CS_2$ glue bases work well in this process as long as the core stock is relatively thin (e.g. 1/8 inch) they leave much to be desired where, for instance 5/16 inch rotary cut core stock is used. Such heavier core stock resists lying completely flat and tends to curl, i.e. to assume the arc of the log from which it was cut. This tendency to curl may break the incipient bond existing between the plies at the time the pressure is released (at the end of the 15 minute pressure cycle of the Galber et al. process), since by that time conventional soya/$CS_2$ glue bases have not yet developed sufficient bonding strength (i.e. gel strength) to resist this curling tendency. My novel soya/$CS_2$ glue bases are sufficiently, strongly adhesive (i.e. gelled) within 15 minutes, or less, to resist the curling of even quite thick rotary cut veneer core stock.

The above example, which uses Golick's formula as a starting point, serves well to illustrate the functioning of my two new features and their ability to convert "carbon disulfide thickening" as it has been known in the past, into thermally reversible carbon disulfide gelation.

In practice, my new soya/$CS_2$ glue base may be much less complex. To illustrate, if any one of the three following compositions of ingredients is combined to form a smooth slurry and then submitted to heat treatment as described in detail above, my new soya/$CS_2$ glue base results.

*Composition No. 1*

| | Grams |
|---|---|
| Water | 1250 |
| "Low-fat" soya flour | 400 |
| Sodium hydroxide dissolved in 100 grams water | 20 |
| Carbon disulfide | 8 |

*Composition No. 2*

| | Grams |
|---|---|
| Water | 1650 |
| "Unmodified" isolated soya protein | 300 |
| Sodium hydroxide dissolved in 100 grams water | 22½ |
| Carbon disulfide | 9 |

*Composition No. 3*

| | Grams |
|---|---|
| Water | 1350 |
| "Unmodified" isolated soya protein | 300 |
| Soda ash (added as dry salt) | 75 |
| Carbon disulfide | 9 |

Preferably, each of the three above disclosed compositions may be prepared by combining the ingredients in the order listed, under agitation. Each resulting dispersion is heated, while agitation is continued, to 150° F., and held at that temperature for about 20 minutes. The dispersion is then cooled to 130° F. and applied to paper plies. A temperature of 130° F. gives ample temperature gradient between the glue base and a ply at substantially room temperature to produce practically instantaneous gelling of the glue base upon application to the ply. The glue base so produced may be kept fluid by maintaining a temperature of 130° F. for a full work day of 8 hours, permitted to gel by cooling to room temperature, allowed to remain in gel form for a week, again liquified by heating to 130° F. and then used for lamination, without substantial diminution in adhesive power. If desired, the glue base may be kept continuously at 130° F. for 24 hours or longer, without substantial diminution in adhesive power.

Other soya glue bases have been prepared following exactly the directions given in the preceding paragraph except for the substitution, in place of the sodium hydroxide, of Composition No. 1 and Composition No. 2 of stoichiometrically equivalent amounts of potassium hydroxide, of lithium hydroxide, of calcium hydroxide, of barium hydroxide and of strontium hydroxide. The resulting soya glue bases are essentially similar to those prepared with sodium hydroxide, although the working properties are not wholly identical.

Another of my new soya/$CS_2$ glue bases is illustrated by Composition No. 4 which is made as follows:

*Composition No. 4*

| | Grams |
|---|---|
| Water | 380 |
| Soya flour ("low-fat" 54% protein) | 175 |
| Stir out lumps and add | |
| Water | 190 |
| $CS_2$ | 4 |
| Calcium hydroxide | 9 |
| Suspended in | |
| Water | 35 |
| Stir 30 minutes and add | |
| Water and hold at 150° F. for 30 minutes | 70 |

The composition of No. 4 is quite fluid at temperatures above 100° F., but at room temperature it is quite viscous, i.e. of a consistency bordering on gelation, although it is not really a true gel.

Depending upon the particular adhesive purpose for which my novel soya glue bases are intended, the glue bases may be employed with or without extenders of various kinds and in various amounts. Such extenders may be mineral substances colloidally dispersed in the glue bases such as the usual inert pigments used in the paint industry, e.g. titanium dioxide, lithopone, zinc sulfide, blanc fixe, natural baryates, calcium sulfate, chalk, coating clays, filler clays, talc, mica, slate flour, bentonite, various earths such as Florida earth, fuller's earth, diatomaceous earth, and the like. The ratio of such mineral solids to dispersed "low-fat" soya flour or unmodified isolated soya bean protein will vary, depending on the particular working properties desired and the adhesive purposes to be met. Various amounts of organic extenders may also be used such as asphalt, natural and synthetic rubber or elastomer latices, Vinsol resin, and the like. As a rule, anywhere from a few pounds (2 or 5 or 10 pounds) up to 500 pounds or more of these various mineral and/or organic, non-protein extenders may be used for each 100 pounds of "low-fat" soya flour or unmodified isolated soya bean protein. As is well known to those skilled in the art, an appropriate amount of additional water is used to establish any particular desired viscosity and working properties.

Mixtures of soya flour and unmodified isolated soya proteins may be used. Even other proteins such as animal glue, casein, blood and modified isolated soya protein may be used as extenders, in amounts not greater than 1 or 2 parts (by weight) per each part of soya flour or unmodified isolated soya protein. If greater amounts of such other proteins are used, then most of the desirable properties of my new glue bases are reduced to a level of questionable value.

Where the amount of water or extender is very large, as compared to the amount of "low-fat" soya flour or unmodified isolated soya bean protein, the formation of gel on reduction in temperature may not be so pronounced, or only a rise in viscosity may take place.

Many chemicals may also be used as modifying agents. For instance, 0.1 to 10.0% sodium sulfite produces a small reduction in viscosity accompanied by some change in consistency. Also, as the very last step in the preparation of my new glue bases, 5% to 15% of 28% aqueous ammonium hydroxide may be added, to produce an extremely long pot life (one month or more). The ammonia counteracts a tendency toward decreasing pH on long standing. But the ammonia must be added as the last ingredient (after the protein-$CS_2$ complex formation is complete) since otherwise the ammonia will combine with the $CS_2$ and thus prevent the $CS_2$ from combining with the protein.

The bonds established by my soya glue base are characterized by unique properties. Specifically, these bonds are resistant to boiling water. Thus, following the testing directions of JAN–P–108 for solid fiberboard made with my novel soya glue base, this board, after 5 hours in boiling water, may be flexed to destruction without any delamination being effected at the glue line. In other words, the delamination is confined to the paper stock. Fiber boards laminated with polyvinyl alcohol, on the other hand, delaminate spontaneously at the glue line after only 3 minutes in the boiling water. Fiber boards laminated with starch-urea resins are not much better than those laminated with polyvinyl alcohol.

The reason for the excellent performance and bonding properties of my soya glue base very likely is connected with the characteristic curds formed by my soya glue base when acidified. As is well known, when milk is acidified to precipitate casein, the tiny particles formed at first soon coalesce to form aggregates ranging in size from marbles to basket balls. These large aggregates upon standing even briefly in the whey shrink to form strongly glutinous masses. The protein of my novel soya glue base behaves essentially like casein when precipitated with acid. But when an alkaline extract of soya bean protein is acidified to precipitate the protein, the small precipitated particles show no tendency to coalesce. This, incidentally, makes it quite difficult to separate the precipitate from the whey. The same applies to a conventional soya flour/$CS_2$ glue prepared as taught by Golick and diluted with 10–20 parts of water before being acidified. Small discrete, non-coalescing particles are formed. The differences between the two types of protein precipitates is easily noted on visual inspection and can readily be shown photographically.

It has been shown (see the patents to Bain, #2,637,675, and to Peterson, #1,977,404), that the interface between the glue film and the paper in a laminate is always acidified. Thus, at the interface the protein is present in curd form. It follows that the nature of the curd will influence the strength of the bond.

In any event, solid fiberboard laminated with my novel soya glue base will be a new article of commerce readily distinguishable from all conventional solid fiberboard by the boiling water test mentioned hereinabove.

Many details may be varied without departing from the principles of this invention and it is therefore not my purpose to limit the patent granted on this invention otherwise than necessitated by the scope of the appended claims.

I claim:

1. A method of preparing a soya glue base which comprises dispersing in water 100 parts by weight of a material selected from the group consisting of "low-fat" soya flour and unmodified isolated soya protein, dissolving in said water an alkaline composition selected from the group consisting of the alkali metal hydroxides and the alkaline earth metal hydroxides, the amount of said composition being from 3½ parts by weight to 8 parts by weight when said selected material is "low-fat" soya flour and from 3½ to 11 parts by weight when said selected material is unmodified isolated soya protein and between ½ and 10 parts carbon disulfide, and thereafter heating the resulting dispersion at a temperature of from about 100° F. to 200° F. for from about 10 to about 30 minutes until said dispersion is capable of gelling at a temperature below about 100° F.

2. In the process of making a long "pot-life" soya/$CS_2$ glue, the step of carbon-disulfide-thickening the glue by heating from about 100° F. to about 200° F. for from about 10 to about 30 minutes, 100 parts by weight dispersed in water, soya protein material selected from the group consisting of low fat soya flour and unmodified isolated soya protein in the presence of ½ to 10 parts $CS_2$ and of an alkaline composition selected from the group consisting of the alkaline earth hydroxides and the alkali metal hydroxides until the disulfide thickening has taken place, the amount of said composition being from 3½ parts by weight to 8 parts by weight when said selected material is "low-fat" soya flour and from 3½ to 11 parts by weight when said selected material is unmodified isolated soya protein, and from 1 to 2 parts by weight of an extender.

3. A method according to claim 2 comprising, as a final step, incorporating with the glue aqueous ammonia in an amount of from 5% to 15% by weight of 28% aqueous ammonia.

4. A method of laminating cellulosic plies which comprises applying to one or more of said plies a glue base having a temperature above 130° F., consisting essentially of 100 parts by weight dispersed in water of a material selected from the class consisting of "low-fat" soya flour and unmodified isolated soya bean protein, from ½ to 10 parts of carbon dsulfide and an alkaline composition selected from the group consisting of the alkali metal hydroxides and the alkaline earth metal hydroxides, the amount of said composition being from 3½ parts by weight to 8 parts by weight when said selected material is "low-fat" soya flour and from 3½ to 11 parts by weight when said selected material is unmodified isolated soya protein, said glue base being fluid above 100° F. and gelatinous below 100° F., applying pressure and maintaining said plies substantially in contact until the interposed glue film has thermally gelled.

References Cited by the Examiner
UNITED STATES PATENTS

| | | | |
|---|---|---|---|
| 1,691,661 | 11/28 | Laucks et al. | 106—155 |
| 1,950,060 | 3/34 | Osgood | 106—154 |
| 2,150,175 | 3/39 | Laucks et al. | 106—154 |
| 2,844,482 | 7/58 | Maskey | 106—154 |
| 2,894,847 | 7/59 | Wright | 106—154 |
| 3,019,146 | 1/62 | Haigh et al. | 154—45.9 |
| 3,066,062 | 11/62 | Gordon et al. | 154—45.9 |

ALFRED L. LEAVITT, *Primary Examiner.*

JOHN R. SPECK, MORRIS LIEBMAN, ALEXANDER H. BRODMERKEL, *Examiners.*